No. 755,059. Patented March 22, 1904.

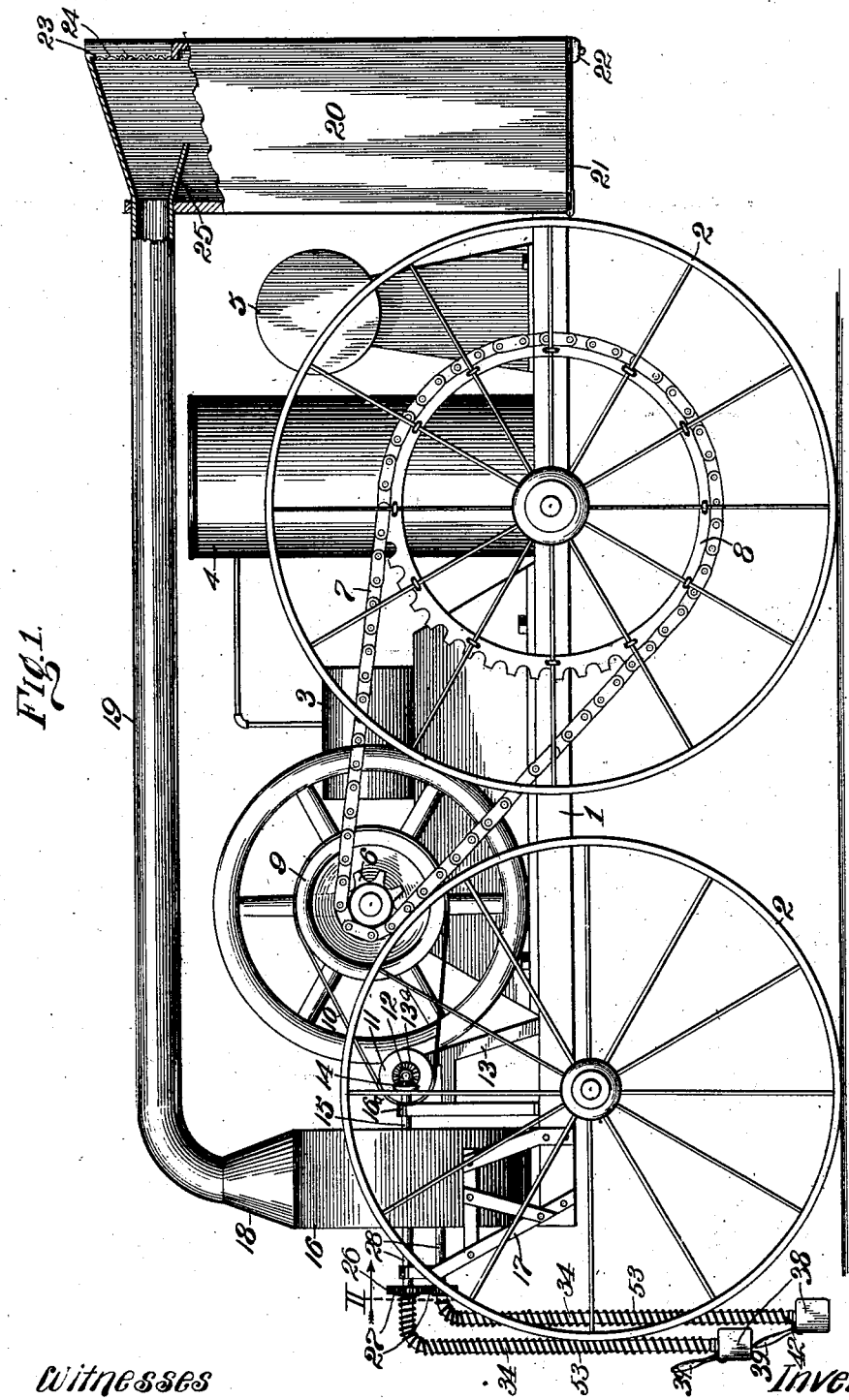

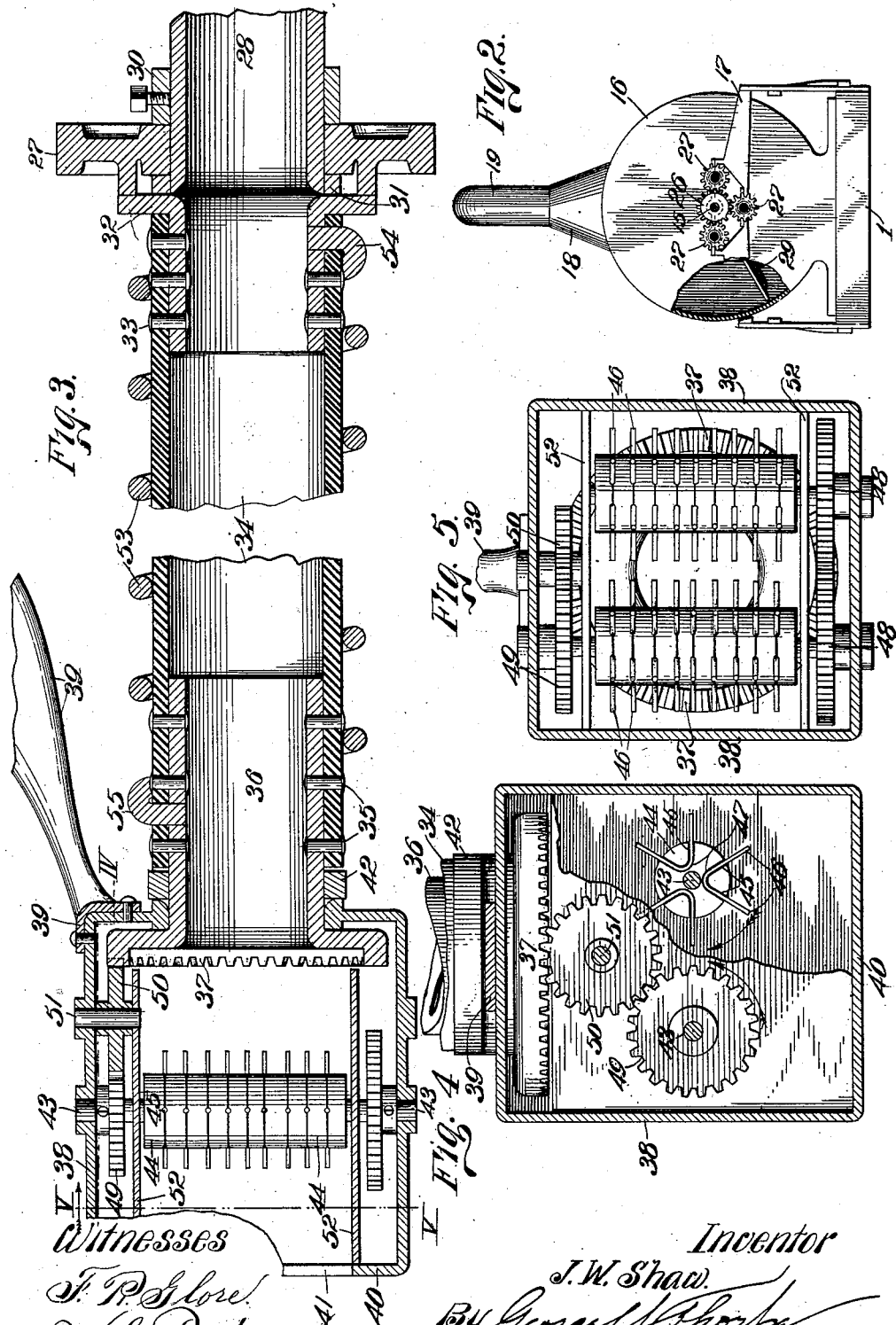

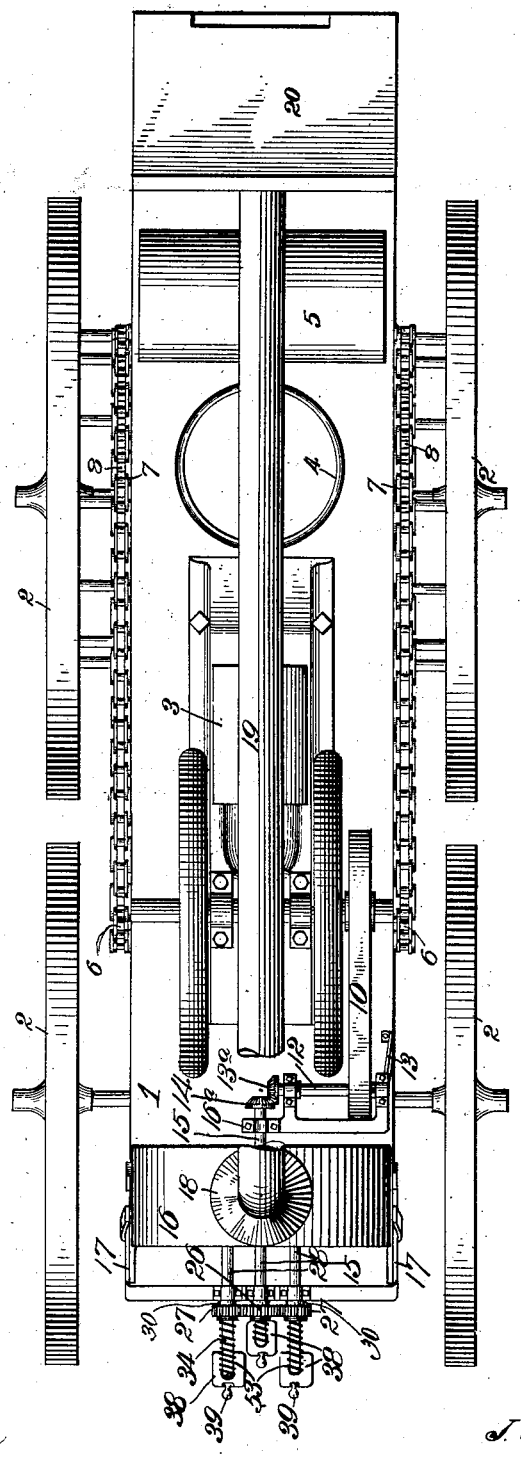

UNITED STATES PATENT OFFICE.

JOHN WILLIAM SHAW, OF LAWRENCE, KANSAS.

COTTON-PICKING MACHINE.

SPECIFICATION forming part of Letters Patent No. 755,059, dated March 22, 1904.

Application filed November 27, 1903. Serial No. 182,823. (No model.)

*To all whom it may concern:*

Be it known that I, JOHN WILLIAM SHAW, a citizen of the United States, residing at Lawrence, in the county of Douglas and State of Kansas, have invented certain new and useful Improvements in Cotton-Picking Machines, of which the following is a specification.

This invention relates to cotton-picking machines, and has for its object to produce a machine which will traverse the field of cotton without injury to the plants and remove the bolls of cotton efficiently and quickly without injuring the seed and mixed with a minimum amount of trash; furthermore, a machine which acts to automatically separate the dust from the cotton previous to storing the latter preliminary to its deposit in sacks or other receptacles.

With these general objects in view the invention consists in certain novel and peculiar features of construction and organization, as hereinafter described and claimed, and in order that it may be fully understood reference is to be had to the accompanying drawings, in which—

Figure 1 represents a side elevation of a cotton-picking machine embodying my invention, a portion of said figure being shown in section. Fig. 2 is a section taken on the line II of Fig. 1. Fig. 3 is an enlarged longitudinal section, broken away at its middle, showing the construction of the picking mechanism and its connection with the suction mechanism. Fig. 4 is a horizontal section, partly broken away, taken on the dotted line IV of Fig. 3. Fig. 5 is a section taken on the line V V of Fig. 3. Fig. 6 is a top plan view of the machine.

Referring now to the drawings in detail, where like reference characters designate corresponding parts, a suitable truck comprises a substantially horizontal framework 1, having its wheels 2 of diameter to support the framework 1 sufficiently high to clear the top of the plants, the machine being sufficiently wide for the wheels to travel in alternate rows, so that the body of the machine shall pass over two rows simultaneously, the tires of the wheels being broad, so as to obtain a wide bearing-surface in order to travel with the minimum of friction over soft or swampy soil.

Mounted upon the machine and adapted to drive the same, as hereinafter explained, is a suitable motor, that shown and preferred being a gas-engine 3, said engine being equipped with the usual water-tank 4, suitably supported, an oil-supply tank 5 being also mounted on the machine. The shaft of the engine is equipped with the sprocket-wheels 6, connected by drive-chains 7 with the large sprocket-wheels 8, rigidly secured to the rear wheels 2. The engine-shaft is also provided with a belt-wheel 9, connected by the belt 10 with the small belt-wheel 11 on the short shaft 12, journaled in a suitable frame 13, mounted on the truck-framework 1, and said shaft 12 is provided with a bevel-gear 13ª, meshing with a similar gear 14 on the shaft 15, which extends through fan-casing 16, mounted on the front end of the machine, said shaft being suitably journaled in frames 16ª and 17 of the truck-framework. The fan-casing is provided at its upper end with a tapering nozzle 18, connected by a pipe 19, which extends through the front wall and into the upper end of a suitable crate or receptacle 20, capable of holding, by preference, about three hundred pounds of cotton and having a hinged bottom 21, held normally closed by any suitable latch 22, which can be easily manipulated to permit the weight of the cotton to swing the hinged bottom open preliminary to depositing the cotton in bags (not shown) or other suitable receptacle. In the upper end of the back wall of the crate directly opposite pipe 19 is an opening 23, bridged or covered by the foraminous plate or screen 24, against which the cotton as discharged from pipe 19 is adapted to strike in order to give time for the air-blast to separate the dust from the cotton and discharge the former through the screen, the cotton dropping down into the crate in an obvious manner. This operation is rendered more reliable by the employment of the guide-plate 25, which projects rearwardly into the crate at the lower side of the pipe, as shown in Fig. 1.

Secured rigidly to the front end of shaft 15 is a gear-wheel 26, which meshes with a series of pinions 27, journaled on tubular thimbles or stationary shafts 28, mounted at their front ends in bearing-frame 17 and at their rear ends in the fan casing, in order that the fan 29, carried by shaft 15 within said casing and of any suitable or preferred type, will create and maintain suctional action through said thimbles. The pinions 27 are prevented from any but rotatable movement on the thimbles by means of rigid collars 30 and 31, and rigidly secured to said pinions and projecting forwardly of the thimbles and registering therewith are tubular extensions 32, upon which are riveted, as at 33, the rear ends of rubber or other flexible tubes 34. The rubber tubes, where there are only three employed, are of sufficient length to give the persons handling the same access to six rows of cotton, each person being expected, as the machine moves across the field, to pick the cotton from the two rows of plants between which he walks, and owing to the fact that the "pickers" are at the front end of the machine it is obvious the "picking" can be accomplished easier and quicker than where the pickers are arranged at the side of the machine, because the operators can handle the tubes with less inconvenience. The front ends of the flexible tubes are riveted, as at 35, upon the tubular thimbles 36, rigidly formed with or secured in and projecting rearwardly from the crown-gears 37, said tubular portions being journaled in the rear walls of casings 38, provided by preference at their upper rear corners with handles 39 for the operators. The front ends of the casings are flanged inwardly, as at 40, for a slight distance, so as to provide openings 41 in the front ends of the casings large enough to fit completely over the bolls of cotton, and to prevent longitudinal movement of the casings on thimbles 36 the latter are equipped with rigid collars 42 at the rear sides of the casings.

43 designates vertical shafts journaled in the casings at a suitable distance rearward of openings 41, and mounted rigidly on said shafts are picking-rollers, the preferred type of construction being a series of superposed collars 44, said collars being provided in their proximate faces with registering radial grooves 45, wherein are rigidly clamped the radial picking-arms 46, and for convenience and rigidity of structure said arms are preferably in the form of V-shaped wires, the contiguous grooves 45 being united at their inner ends by curved grooves 47 to receive the joined ends of said arms. The rollers are geared together at their lower ends by cog-wheels 48, and the upper end of one roller is equipped with a cog-wheel 49, meshing with an idler-gear 50, journaled on a stub-shaft 51, depending from the top wall of the casing, said idler-gear 50 meshing with the crown-gear 37 for the purpose of transmitting motion from the latter to cog-wheel 49. In order to prevent the entanglement of the cotton with said gear-wheels, the casing is provided with partitions 52, interposed between the rollers and said power-transmitting gearing, the upper partitions also serving as a lower support for the idler-gear 50, as shown in Fig. 3.

The means for transmitting power from each pinion 27 to its companion crown-gear is a spiral shaft 53, snugly encircling the flexible tube 34, and secured at its rear or upper end to the pinion extension 32, as at 54, or in any other suitable manner, and at its front end to the crown-gear extension or thimble 36, as at 55, or in any other suitable manner. These spiral flexible shafts serve not only as a means of transmitting power, but also as a protection for the flexible tubes 34, as will be readily understood.

The machine is adapted to be provided with the customary means for controlling the action of the engine, with the customary means for guiding the machine, and with the customary means for throwing the engine out of gear with wheels 2, so as to enable the operator, if desired, to drive the picking mechanism while the machine is stationary, and in practice it is designed that such means shall be so disposed that one of the operators may control the machine while walking beside it. The machine, furthermore, as in machines of this type, is also adapted to be provided with a seat, though this feature, like the controlling mechanism for the different purposes referred to, may be of any common or well-known type, and therefore is not illustrated in this connection.

In practice as the machine traverses the field the operators with great rapidity and convenience slip the casings over the different bolls of cotton in order that the rollers rotating inwardly and rearwardly, as indicated by the arrows, Fig. 4, shall be brought into direct contact with the cotton-bolls to seize and tear the cotton apart, the length of the teeth being such that the seed shall not be punctured or otherwise injured. As the cotton is thus torn apart it, with the seed, is drawn by the strong suctional blast up through the crown-gears and into the flexible tubes and passes up through the latter and thimbles 28 into the fan-casing, from which it is forced by the centrifugal action of the fan and the forced blast therefrom up through the nozzle of the casing and back through tube 19 into the upper end of the crate, where it impinges against the screen to permit the dust to escape through the latter to atmosphere, the cotton dropping down into the crate, as hereinbefore stated.

With a machine of this character it is obvious that cotton can be picked and deposited in the crate in a cleaner state than by hand and, furthermore, with far greater rapidity, it being estimated that each operator will gather at least three times as much cotton as can be picked manually, and the cotton picked by this machine, by reason of containing less trash and dust, will be of better quality.

I am aware that cotton-pickers have been patented provided with fingered or toothed rolls and with air-blasts for conveying the cotton to the crate or storage receptacle, but I am not aware of the existence of a structure or of a patent embodying pickers connected to the front end of the machine and possessing the same detail construction as the one forming the subject of this application. For instance, I am not aware of the existence of any structure equipped with toothed rollers or their equivalent rotary saws, which draw from both sides, and therefore gather almost every bit of the cotton.

While I have illustrated and described the preferred embodiment of my invention, it is obviously susceptible of modification in various particulars without departing from its spirit and scope or sacrificing any of its advantages.

Having thus described the invention, what I claim as new, and desire to secure by Letters Patent, is—

1. In a machine of the character described, a fan-casing, a driven fan therein, one or more tubes or thimbles communicating with said casing, a driven flexible tube communicating with each thimble, a casing journaled at the front end of and communicating with said tube and having an opening, a pair of toothed rollers journaled in said casing for direct contact with the cotton-bolls, means for rotating said rollers inwardly and rearwardly to pick the cotton within the casing, and means for creating a suctional blast through the casing and the communicating tube and thimble.

2. In a machine of the character described, a fan-casing, a driven fan therein, one or more tubes or thimbles communicating with said casing, a driven flexible tube communicating with each thimble, a casing journaled at the front end of and communicating with said tube and having an opening, a pair of toothed rollers journaled in said casing for direct contact with the cotton-bolls, driven gearing rotating said rollers inwardly and rearwardly to pick the cotton within the casing, partitions for the casing between said rollers and said gearing, and means for creating a suctional blast through the casing and the communicating tube and thimble.

3. In a machine of the character described, a fan-casing, a driven fan therein, one or more tubes or thimbles communicating with said fan-casing, a driven flexible tube communicating with each thimble, a thimble secured to the front end of said tube and equipped at its front end with a crown-gear, a casing journaled on said thimble and inclosing said crown-gear, a pair of shafts journaled in said casing and equipped with cotton-picking rollers, gearing connecting said rollers at one end, a cog-wheel mounted at the opposite end of one of said rollers, an idler-gear connecting said cog-wheel with the crown-gear, and partitions between the ends of said rollers and said gearing.

4. In a machine of the character described, a fan-casing, a driven fan therein, one or more tubes or thimbles communicating with said casing, a driven pinion journaled on the front end of each thimble, and provided with a tubular extension registering with said thimble, a flexible tube secured upon each pinion extension, a thimble secured in the front end of each tube and equipped with a crown-gear, a flexible spiral shaft encircling the tube and connected rigidly at one end with the pinion, and at the other end with the crown-gear, a casing journaled on the thimble and inclosing the crown-gear, a pair of shafts journaled in said casing and equipped with cotton-picking rollers, gearing connecting said rollers at one end, a cog-wheel mounted at the opposite end of one of said rollers, an idler-gear connecting said cog-wheel with the crown-gear, and partitions between the ends of said rollers and said gearing.

5. In a machine of the character described, a fan-casing, a driven fan therein, one or more tubes or thimbles communicating with said casing, a driven pinion journaled on the front end of each thimble and provided with a tubular extension registering with said thimble, a flexible tube secured upon each pinion extension, a thimble secured in the front end of each tube and equipped with a crown-gear, a flexible spiral shaft encircling the tube and connected rigidly at one end with the pinion, and at the other end with the crown-gear, a casing journaled on the thimble and inclosing said crown-gear, a handle secured rigidly to said casing, a pair of shafts journaled in said casing and equipped with cotton-picking rollers, gearing connecting said rollers at one end, a cog-wheel mounted at the opposite end of one of said rollers, an idler-gear connecting said cog-wheel with the crown-gear, and partitions between the ends of said rollers and said gearing.

6. In a machine of the character described, a fan-casing, a driven shaft extending through the same and provided with a fan within the casing, a gear-wheel upon said shaft, one or more tubes or thimbles communicating at their rear ends with the fan-casing, a pinion journaled on each thimble and meshing with the fan-shaft gear, a flexible tube rigidly connected at its rear end to said pinion and communicating with said thimble, a crown-gear having a thimble fitting in and secured to the front end of said tube, a spiral flexible shaft encircling said tube and connected rigidly at its opposite ends with the pinion and crown-gear, a casing journaled on the last-named thimble and inclosing the crown-gear, a pair of shafts journaled in said casing and equipped with cotton-picking rollers, gearing connecting said rollers at one end, a cog-wheel mounted at the opposite end of one of said rollers, an idler-gear connecting said cog-wheel with the crown-gear, and partitions between the ends of said rollers and said gearing.

7. In a machine of the character described, the combination with a suction-fan and means for operating the same, and a flexible rotating tube, of a casing communicating with and journaled at the front end of said tube, and having an opening opposite said tube, and a pair of rollers journaled in said casing between said opening and said tube, and rotating rearwardly and inwardly, each roller comprising a shaft, a series of superposed collars formed in their proximate faces with registering radial grooves connected at their inner ends, and teeth projecting from said collars and comprising substantially V-shaped wires secured in said registering grooves with their ends projecting outwardly beyond the periphery of the collars.

8. A cotton-picking machine, comprising a wheeled frame, a motor mounted on said frame and geared to certain of its wheels, a crate carried at the rear end of said frame and provided in the upper end of its rear wall with a screen-covered opening, a suctional fan mounted on the front end of said frame and geared to said motor, a tube connected to the upper portion of said suctional fan, and communicating with the crate at the opposite side from and in line with said screen-covered opening, means for picking the cotton, and flexible tubes connecting said means with the suctional fan.

9. A cotton-picking machine, comprising a wheeled frame, a motor mounted on said frame and geared to certain of its wheels, a crate carried at the rear end of said frame and provided in the upper end of its rear wall with a screen-covered opening, and having a hinged bottom, a suctional fan mounted on the front end of said frame and geared to said motor, a tube connected to the upper portion of said suctional fan, and communicating with the crate at the opposite side from and in line with said screen-covered opening, means for picking the cotton, and flexible tubes connecting said means with the suctional fan.

In testimony whereof I affix my signature in the presence of two witnesses.

JOHN WILLIAM SHAW.

Witnesses:
 H. R. WAGNER,
 FRED GOETTE.